(12) United States Patent
Giraldo Orozco et al.

(10) Patent No.: US 8,994,207 B2
(45) Date of Patent: Mar. 31, 2015

(54) SYSTEM FOR GENERATING ELECTRICAL ENERGY FROM LOW SPEED WIND ENERGY BY MEANS OF TWO SYSTEMS OF DRIVE BLADES

(75) Inventors: Mauricio Giraldo Orozco, Antioquia (CO); Cesar Nieto Londoño, Antioquia (CO); Diego Andres Florez Londoño, Antioquia (CO); Ana Cecilia Escudero, Antioquia (CO); Santiago Lopez Ruiz, Antioquia (CO); Maria Camila Fernandez, Antioquia (CO)

(73) Assignees: Universidad Pontificia Bolivariana, Bógota (CO); Ecopetrol S.A., Bógota (CO)

( * ) Notice: Subject to any disclaimer, the term of this patent is extended or adjusted under 35 U.S.C. 154(b) by 91 days.

(21) Appl. No.: 13/991,142

(22) PCT Filed: May 31, 2011

(86) PCT No.: PCT/IB2011/052401
§ 371 (c)(1),
(2), (4) Date: Aug. 19, 2013

(87) PCT Pub. No.: WO2012/073124
PCT Pub. Date: Jun. 7, 2012

(65) Prior Publication Data
US 2013/0341933 A1    Dec. 26, 2013

(30) Foreign Application Priority Data
Dec. 2, 2010   (CO) .................................. 10-152064

(51) Int. Cl.
*F03D 9/00*      (2006.01)
*H02P 9/04*      (2006.01)
(Continued)

(52) U.S. Cl.
CPC   *F03D 9/002* (2013.01); *F03D 3/02* (2013.01); *F05B 2240/213* (2013.01); *F05B 2240/214* (2013.01); *F05B 2250/25* (2013.01); *F05B 2250/311* (2013.01); *Y02E 10/74* (2013.01)
USPC .............. 290/55; 290/44; 415/4.2; 416/197 A

(58) Field of Classification Search
USPC ...................... 290/44, 55; 415/4.2; 416/197 A
See application file for complete search history.

(56) References Cited

U.S. PATENT DOCUMENTS 1,100,332 A * 6/1914 Smith ........................... 416/175
1,200,308 A * 10/1916 Bunnell ...................... 415/211.1
(Continued)

FOREIGN PATENT DOCUMENTS

GB    2 404 227 A    1/2005
GB    2 451 670 A    2/2009
(Continued)

OTHER PUBLICATIONS

International Search Report dated Nov. 10, 2011, issued in corresponding international application No. PCT/IB2011/052401.
(Continued)

*Primary Examiner* — Pedro J Cuevas
(74) *Attorney, Agent, or Firm* — Lempia Summerfield Katz LLC

(57) ABSTRACT

The invention relates to a system for generating electrical energy from wind energy, said system being characterized in that the design makes use of small air currents and does not require a large amount of air in order to generate electrical energy or power. This system incorporates two generating technologies designed based on the vertical rotation axis concept, achieving movement that is independent of wind direction. The invention combines two technologies, namely: one based on drag forces, ideal for low speed conditions; and another based on lift force, which is best for high speed work.

8 Claims, 3 Drawing Sheets

(51) Int. Cl.
*F03D 3/02* (2006.01)
*F03D 7/00* (2006.01)

(56) References Cited

U.S. PATENT DOCUMENTS

| | | | | |
|---|---|---|---|---|
| 1,677,745 | A * | 7/1928 | Bonetto | 415/232 |
| 1,963,196 | A * | 6/1934 | Frisch | 416/44 |
| 3,918,839 | A | 11/1975 | Blackwell et al. | 416/175 |
| 4,082,479 | A * | 4/1978 | Rangi et al. | 416/23 |
| 4,474,529 | A * | 10/1984 | Kinsey | 415/4.2 |
| 4,575,311 | A * | 3/1986 | Wood | 416/170 R |
| 4,718,821 | A * | 1/1988 | Clancy | 416/44 |
| 5,133,637 | A * | 7/1992 | Wadsworth | 415/4.4 |
| 5,171,127 | A * | 12/1992 | Feldman et al. | 416/119 |
| 5,183,386 | A * | 2/1993 | Feldman et al. | 416/119 |
| 5,246,342 | A * | 9/1993 | Bergstein | 416/197 A |
| 5,333,996 | A * | 8/1994 | Bergstein | 416/197 A |
| 6,345,957 | B1 * | 2/2002 | Szpur | 416/197 A |
| 6,857,846 | B2 * | 2/2005 | Miller | 415/4.2 |
| 6,913,435 | B2 * | 7/2005 | Seki | 415/4.1 |
| 8,257,018 | B2 * | 9/2012 | Coffey | 415/4.2 |
| 8,322,992 | B2 * | 12/2012 | Fuller | 416/197 A |
| 8,450,872 | B2 * | 5/2013 | Huang et al. | 290/55 |
| 2007/0018464 | A1 | 1/2007 | Becker | 290/55 |
| 2007/0138886 | A1 * | 6/2007 | Krebs et al. | 310/112 |
| 2009/0097981 | A1 * | 4/2009 | Gabrys | 416/204 R |
| 2010/0296913 | A1 * | 11/2010 | Lee | 415/4.2 |
| 2011/0027084 | A1 * | 2/2011 | Rekret | 416/126 |
| 2012/0195761 | A1 * | 8/2012 | Nouris | 416/205 |
| 2013/0320138 | A1 * | 12/2013 | Dickson et al. | 244/110 F |

FOREIGN PATENT DOCUMENTS

| | | |
|---|---|---|
| GB | 2460526 A | 12/2009 |
| JP | 2007092599 | 4/2007 |
| KR | 2009 0112469 A | 10/2009 |
| WO | WO 2008/157174 A1 | 12/2008 |
| WO | WO 2009/092867 A1 | 7/2009 |

OTHER PUBLICATIONS

Written Opinion dated Nov. 10, 2011, issued in corresponding international application No. PCT/IB2011/052401.

* cited by examiner

SYSTEM FOR GENERATING ELECTRICAL ENERGY FROM LOW SPEED WIND ENERGY BY MEANS OF TWO SYSTEMS OF DRIVE BLADES

FIELD OF THE INVENTION

The instant invention refers to a power generation system from wind energy, wherein said system takes advantage of small currents and allows for non-requirement of a great amount of wind for power or electrical energy generation. This system incorporates two generating technologies designed based on the vertical rotation axis concept, achieving movement that is independent of wind direction. One of the technologies is based on drag forces, ideal for low speed conditions, and the other is based on lift force, optimal for high speed work.

The aerodynamic profiles of the system in the instant invention were specifically designed in order to make use of wind conditions pertaining to equatorial countries, achieving a high efficiency for those wind speeds found in said geographical zone. The aerodynamic profiles are able to work in such manner as to increase the spanning effective area, which in turn improves the system's overall efficiency. In addition, both systems are found incorporated by a ball bearing system separating movement between systems, guaranteeing the use of high speed currents in a more convenient manner.

BACKGROUND OF THE INVENTION

Typically, wind generators are classified based on their size and generation capacity. The large wind generators present rotor diameters in excess of 45 meters and generating capacities in excess to 1 MW; medium wind generators have diameters between 12 and 45 meters and generate between 40 and 999 kW; small wind generators have diameters between 3 and 12 meters and produce between 2 and 40 kW; and finally, micro wind generators have diameters smaller than 3 meters and power generation capacities not surpassing 2 kW.

Although the use of large and medium sized systems have been more extensively used worldwide, in order for these to operate adequately, high speed wind conditions are necessary, and a stable wind direction is preferable.

Worldwide, the vast majority of power generated from wind energy installed is obtained from great power systems, reaching extremes such as a nominal capacity system of power generation in excess of 6 MW, known as Enercom E-126.

In general, all usage systems primarily are in the 2 MW range per system, such as the V80-2.0 MW turbine manufactured by Vestas (Vestas Wind Systems A/S, 2009-1). Unfortunately, the great majority of these systems require wind conditions far in excess to those conditions which could be obtained in urban zones worldwide or zones close to the equator and mountainous regions. The limitation is such for these systems for wind conditions such as those in equatorial countries that the wind turbine offered by Vestas for low wind potential, the V100-1.8 MW (Vestas Wind Systems A/S, 2009-2), has an input speed (Cut in wind speed) of 4 m/s, for which it generates total power under 200 kW, despite its spanning area is in excess of 7800 $m^2$.

Amongst the vertical axis wind generators, amongst several, two types stand out; the Savonius-type wind generators, which operate under a differential drag principle between the two faces of each vane, and the Darrieus-type wind generators, which have aerodynamic profiles that provide rotational torque through lift forces. The Savonius-type wind generators are ideal for use in low wind speed conditions or startup moments; however, the Savonius-type wind generators have the problem of being poorly efficient. The Darrieus-type wind generators require greater speeds and present greater efficiencies, thus limiting their use to certain countries and determined geographical zones.

For low powers, the available commercial offer is significantly reduced. For example, Enercom, one of the top worldwide wind generator manufacturers, produces a turbine having power output of 330 kW and 876 $m^2$ as its smallest in its portfolio, known as E-33, while Vestas has developed its V52-850 kW (Vestas Wind Systems A/S, 2009-3) with power generation under 100 kW for wind speeds not exceeding 5 m/s (Cut in wind speed 4 m/s) in a 52 m diameter.

Therefore, one of the greatest problems surfacing with power generation from clean energies, particularly wind energy, is that a great amount of wind is required in order to carry out optimal power production. Likewise, in order to achieve movement of the devices in charge of energy conversion, it is currently required that the same have gigantic sizes, in order for a small movement to be converted in some electrical energy.

Thus, a plurality of disclosures exists in the art related to wind generators or electric power generation systems generated from wind energy. Among this group WO 2009/092867 is found, which discloses a wind generator having a rotor formed by one unit that includes a support unit clamped to a second support unit. The second support unit rotates about the first unit around the vertical axis of the wind generator. In this device, the units forming the blades are fixed to another support unit and an electric generator stator is also held by the support units. The blades form units including a combination of Savonius-type blades and a Darrieus-type assembly with a relatively fixed position. The wind generator produces electrical energy for an external lighting system on streets and avenues. The Darrieus-type turbine blades have a National Advisory Committee for Aeronautics (NACA 015)-type profile.

However, the wind generator claimed in said document shows the disadvantage of requiring that wind direction must be in a specific direction in order to initiate blade movement, something that is not practical in every season and in all countries, primarily those countries close to the equator where wind generation is very little and wind direction varies constantly. Hence, a design is needed where the wind generator blades are moved with very little wind energy and initiate their movement with winds coming from different directions.

On the other hand, GB 2404227 discloses a turbine having an axis that rotates about a longitudinal axis having long-shaped blades resembling a troposkein. The structure's ends compensate from the axis in such a manner the blades are helical and the section perpendicular to the axis is aerodynamic. The section has a defined edge between the interior and exterior edges next to the radius from the axis. The turbine has improved characteristics enabling it to work efficiently at high wind speeds. Optionally, the blades may have a foam core and a coating made of composite material.

Although the above wind generator improves efficacy at low wind speeds, said apparatus has only one blade design system, whereby it may be asserted it works at relatively high wind speeds, but does not work with low speeds, i.e., it is limited for installation solely in geographical areas with relatively high wind speeds, but does not work when there are mixed wind speeds and thus, requires a large wind current to initiate movement and begin to generate electrical energy.

Furthermore, GB 2451670 refers to a wind generator comprising a rotor having a rotation axis that is transverse to wind flow direction. The rotor has multiple blades arranged about the rotation axis. Each blade has an aerodynamic profile formed in such a way the profile of each blade is positioned at an angle between 0° and 90° from a perpendicular plane to the rotation axis. The turbine may be defined as a modified Darrieus rotor having improved performance due to the rib-shaped or concave shape of the blades having reduced drag and greater energy production efficiency.

As with the above document, the invention described herein does not have an internal blade system that increases energy generation efficiency at low wind speeds. This limits its range of use and where the generator may be installed, considering it requires installation in geographical zones exhibiting high wind speeds.

Another prior art document related to the technology of the instant invention is international application WO 2008/157174, which discloses a wind generator showing a group of long blades having a long core with a crossed profile defining a curved cross section at one end having a radius, a linear intermediate cross section tangent to the curved cross section and a curved intermediate cross section having a lesser radius in comparison to the exterior curved cross section radius. The long core is accompanied by a second core also being long-shaped which between both, define a helix. In this wind generator, the cross section profile is maintained constant through the long core, the wind turbine is a Savonius-type turbine and the helix shape shown maintains a soft rotation that does not transmit vibration to the turbine components.

Different to the above generators, the invention reported in WO 2008/157174 refers to an effective system when low wind speeds are present, but does not have good power generation when facing high speeds and the device turns inoperative, thus being poorly efficient in certain geographical areas.

Finally, JP 2007092599 discloses a composite turbine having a pair of Savonius-type blades installed in the generator's wind incidence surface. This arrangement also has a pair of profile blades placed between the Savonius-type blades. The Savonius-type and profile-type blades are extended axially. The diameters of both blade types vary with respect to the cross section of the portion over which the wind hits. This double type blade arrangement has the advantage of being able to initiate rotation at low wind speeds efficiently converting movement into energy, showing greater efficiency at the rotation onset.

Considering the above information, it is evident there was a need in the art for designing and implementing a system for power generation from wind energy, having a double blade system allowing for optimal operation and improving the efficiency of the system both at low wind speeds as well as high wind speeds, in order to be able to be installed in any geographical zone, especially in countries close to the equator where winds are relatively scarce. Likewise, it is necessary for the system to allow for optimal operation and power generation even when wind direction varies constantly.

DESCRIPTION OF THE FIGURES

The invention may be better understood through the use of the figures attached, wherein each element comprising the power generation from wind energy system seeking protection is shown. Likewise, the figures show reference numbers assigned to the elements making up said system.

DETAILED DESCRIPTION OF THE INVENTION

Figure 1:
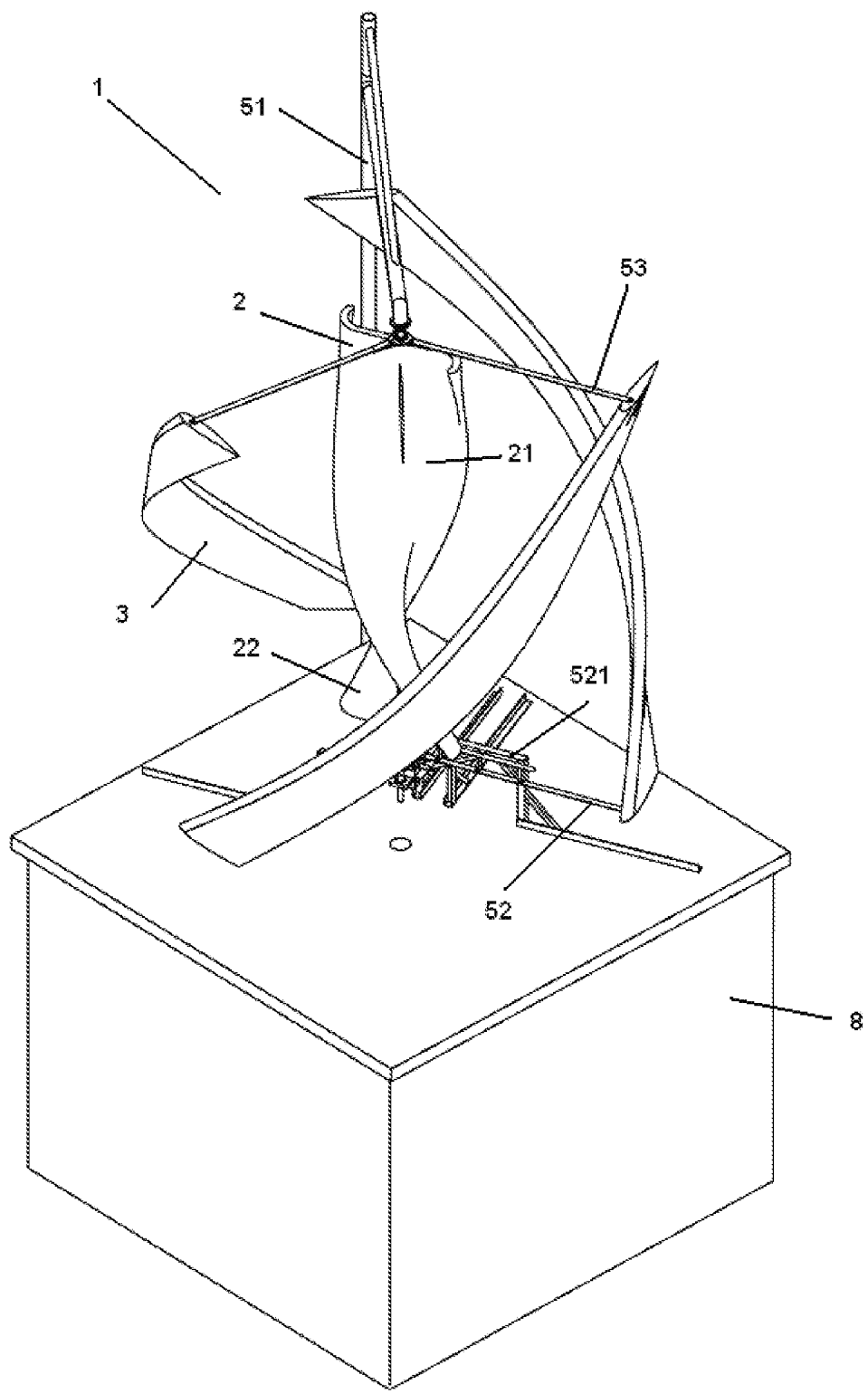
FIG. 1 refers to a perspective view of the electric power generation system.

The present invention is related to a system (1) for electric power generation from wind energy, which comprises primarily the following parts or components:

A first internal use system (2) based on drag forces, which is set in the central part of the helix arms (52, 53) of the support structure (5) of the system (1) on the axis (4);

A second external use system (3) surrounding the first internal system (2) and corresponding to a symmetrical aerodynamic profile located on the external part of the helix arms (52, 53) of the support structure (5);

a central axis (4) joined by their ends to the support structure (5) where the two use systems (2, 3) rest;

a support structure (5) comprising a docking support (51) sustaining the central axis (4) and a pair of helixes, an inferior (52) and a superior (53), each one of them comprising at least three arms;

An inferior support (6) comprising a free wheel or ratchet shaft (61), which acts as a ball bearing in order to allow for the use systems (2, 3) to rotate about the central axis (4);

An axial load transmission system (7) placed beneath the inferior support (6) and having an axis (71) which is set with the free wheel (61) and the central axis (4), and a plurality of arms (72) which allows for the loads or the weight generated by the support structure (5) to be evenly placed; and A power generating system (8) placed toward the bottom part of the vanes, having a direct connection with the wind generating axis. The construction of the electric generator (induction, permanent magnet, etc.) directly depends on the specific wind conditions at the place of installation.

The power generation from wind energy system (1) is designed based on two driving systems. The first system, is an internal use system (2) based on drag forces, located at the central section of the wind generator (1), as shown in FIG. 1. The geometry shows a helical design that allows maximizing torque associated to the drag difference between both faces (21, 22) of each vane, and at the same time reducing negative torque zones. Any oscillation that makes part of the vertical axis systems, related with the change in angle of attack related to the wind direction of the profiles as they rotate is thus allowed to reduce a minimum, and a constant medium torque curve is delivered at the central axis (4). The power generator's operation is facilitated. Likewise, the negative torque zones are disappeared and the stagnation points associated with the zero torque points are eliminated.

The external use system (3) located on the outside of the wind generator (1), as noted in FIG. 1, corresponds to a symmetrical aerodynamic profile, selected to operate at normal wind speeds in countries found near the equator or mountainous conditions. The string size of each one of the blades making up the system (3) directly depends on wind speed, and thus, the string size is selected in order to deliver the useful torque even with pronounced angles of attack.

The external system (3), contrary to the internal system (2), works under the lift principle, increasing power delivered at greater relative speeds between the wind and the system (3). Said second profile or external system (3) is based on a triblade design as a function of maximizing the area exposed without generating interaction between the different profiles that could affect the operation. As with the internal system or profile (2), the vertical advance of profile (3) is helical in order to transmit constant curves of torque to the central axis (4).

The relative diameters of the first system or profile (2) and of the second system or profile (3) have several sizes and meet different goals such as: gain the maximum effective span area, minimize interaction between the internal profile (2) and the external profile (3) and obtain a positive synergy between both profiles (2, 3) as a function of similar angular speeds.

Figure 2:
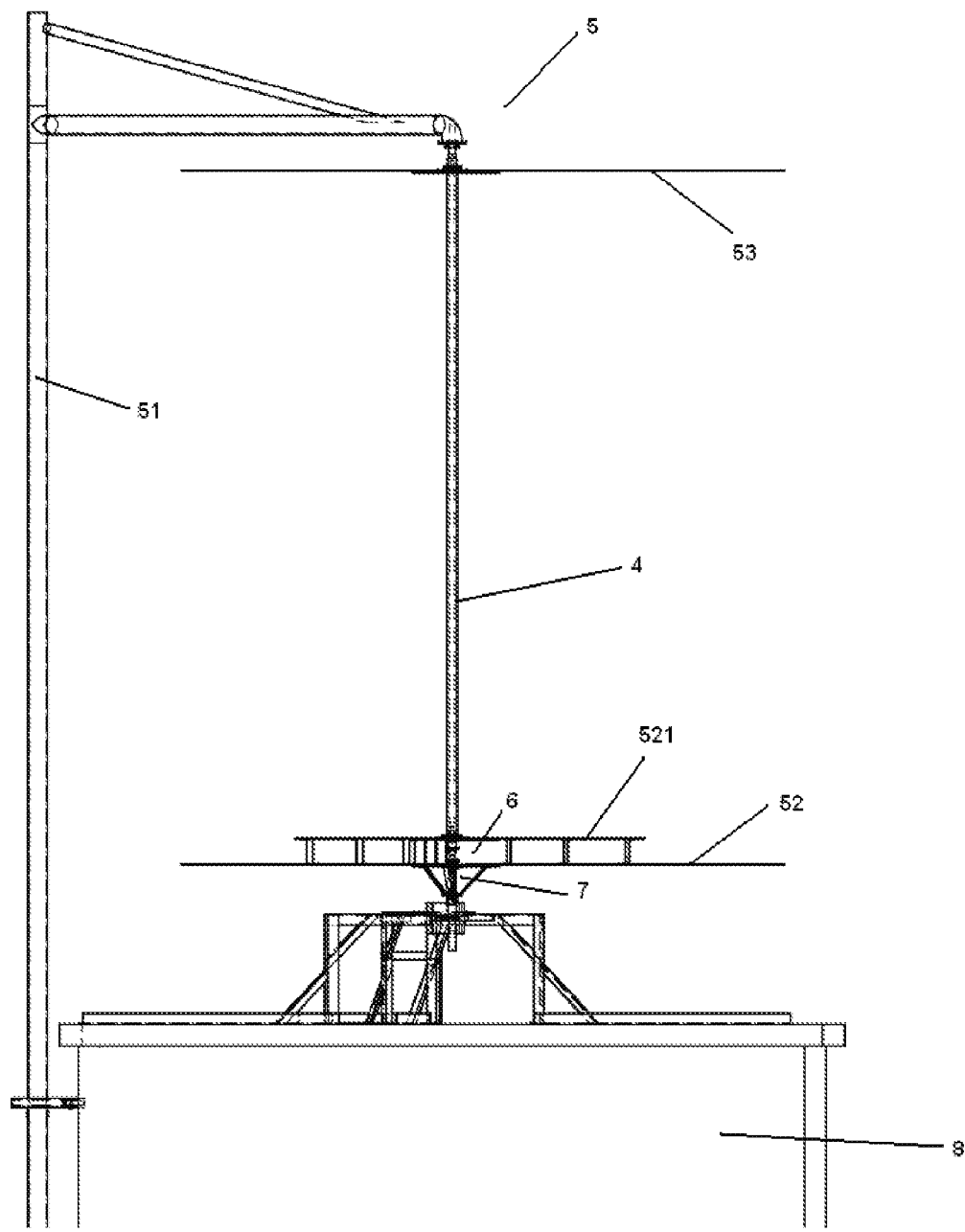
FIG. 2 refers to a plane side view of the structure supporting the electric power generation system.

Both profiles (2, 3) are sustained by a support structure (5), shown in detail in FIG. 2. This structure (5) is comprised by a docking support (51) that is fixed to a surface and thus, the sizes and particular exterior elements may be modified according to the place of installation. The structure (5) also has a pair of helixes having at least three inferior arms (52) and at least three superior arms (53) in order to support the external helical profile (3). The primary function of the superior arms (53) is to deliver coupling points and structural support for the twisting, but not to support important axial loads. The axial load associated to the weight of these elements is thus supported by the inferior arms (52) which are reinforced by a third set of arms (521) of lesser length in order to assure resistance to torsional resistance.

Figure 3:
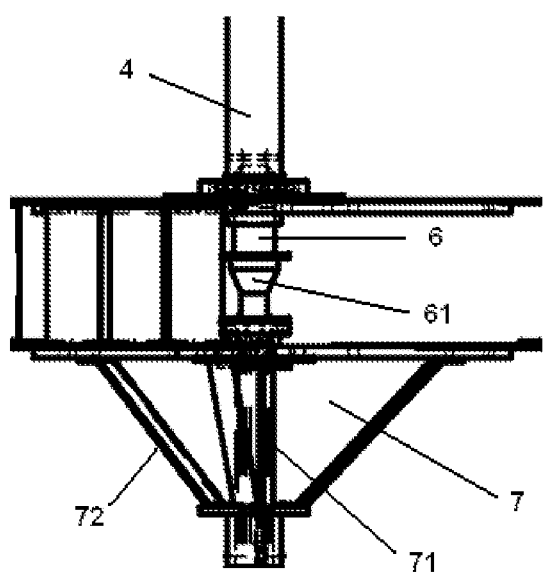
FIG. 3 refers to a detailed view of the bottom part of the electric power generation system, i.e., of the structure seen on FIG. 2 on its bottom part.

Under the set of inferior arms (52), a free wheel system (61) is installed (see FIG. 3). The function of the free wheel system is to separate the internal aerodynamic profile (2) movement from the external profile movement (3) at those moments wherein the wind speed is a strong burst or the rotation speed of the second external profile (3) is superior to that of the first internal profile (2), facilitating the operation with greater efficiency of the generation system (1). The above is due to the greater energy density of the bursts, a regime wherein the internal profile (2) does not show any adequate behavior, given its drag system condition, while the external profile (3) or lift profile exhibits more adequate behaviors.

Furthermore, in order to assure the correct operation of the free wheel (61), it is necessary to consider that these types of devices are not designed to support high axial loads. Therefore, FIG. 3 shows an axial load transmission system (7) comprising a shaft (71) that couples with the free wheel (61) and a plurality of arms (72) that allow to distribute the loads or the weight generated by the structure (5) and all the system overall. Using this load system (7), a transmission of the axial load is performed towards bearing elements especially designed to support these types of loads, allowing for the efficient operation of the free wheel (61) and the reduction of maintenance costs and replacement costs of said element.

Finally, FIG. 3 also shows the coupling system between the superior and inferior wind generator sections (1). This task is performed using a perforated shaft inside the central profile, located inside the first central generation system (2), which allows for adequate transfer of torque in each of the sections of the wind generator towards the power production system. In said figure, the inferior part of the structure (5) is shown, showing both the complete axial load transmission system (7), as well as the central axis (4), which apart from assuring rigidity to the primary structure's (5) flexion, it allows for a correct transmission of the high torques that are borne from normal operation of the internal drag profile (2).

EXAMPLE 1

Table 1 shows a comparison between the efficiency that the power generation system (1) of the instant invention shows in relation to those more common wind generators found in the art. It is important to highlight that in the vast majority, these systems are designed to work in wind speeds significantly higher than 8 to 10 m/s.

TABLE 1

| Manufacturer | Model | Rotor Diameter (m) | Nominal power (kW) | Nominal speed of operation (m/s) | Type |
|---|---|---|---|---|---|
| Bergey WindPower | BWC XL 1 | 2.5 | 1 | 11 | HAWT |
| Jacobs Wind Systems | Model 31-20 | 9.44 | 20 | 11.6 | HAWT |
| Quietrevolution | qr5 | 3.1 | 7 | 12 | VAWT |
| Ampair | Ampair 300 | 1.2 | 0.3 | 12.6 | HAWT |
| Eoltec | Scirocco | 5.6 | 6 | 11.5 | HAWT |
| Mariah Power | Windspire | 1.22 | 1.2 | 11.176 | VAWT |
| Instant invention | | 3 | 2.5-3 | 10 | VAWT |

Therefore, by observing the above table it can be clearly seen that the wind generator (1) of the instant invention shows a level of power generation equivalent in unit area to those presented by the other systems, even more so when it is considered that models such as the Jacobs Wind Systems require spanning areas significantly greater and greater wind speeds to those of the instant invention for their correct operation.

In addition, it is necessary to add that the great majority of the other models available in the art present constructive and functional features which generate rather steep load curves with respect to wind speed. The present invention on the contrary, by including a double aerodynamic system has a faster increase in power generated, without reaching depletion at speeds slightly higher than the nominal such as traditional systems, as may be observed in table 1.

The invention claimed is:

1. A system for electric power generation from wind energy, the system comprising:
    a first internal use system based on drag forces, the first internal use system being set in a central part of helix arms of a support structure of the system on a central axis;
    a second external use system surrounding the first internal system and corresponding to a symmetrical aerodynamic profile located on an external part of the helix arms of the support structure;
    the central axis joined by ends to the support structure where the first internal use system and the second external use system rest;
    the support structure comprising a docking support sustaining the central axis and a pair of helixes, an inferior helix and a superior helix;
    an inferior support (6) comprising a free wheel or ratchet shaft (61), that acts as a ball bearing in order to allow for the first internal use system and the second external use system to rotate about the central axis;
    an axial load transmission system placed beneath the inferior support; and
    a power generating system placed toward a bottom part of vanes, having a direct connection with a wind generating axis.

2. The system of claim 1, wherein the first internal use system comprises two faces.

3. The system of claim 1, wherein the second external use system is based on a triblade design and a vertical advance of the second external use system is helical in order to achieve constant curves of torque to the central axis.

4. The system of claim 1, wherein the support structure has inferior helixes and superior helixes each comprising at least three arms.

5. The system of claim 4, wherein the inferior helixes are reinforced by a third set of arms of lesser length in order to assure torsional resistance.

6. The system of claim 1, wherein the axial load transmission system comprises a shaft and a plurality of arms that allow to distribute loads or a weight generated by the support structure.

7. The system of claim 6, wherein the shaft couples with the free wheel and the central axis.

8. The system of claim 1, wherein the superior and inferior sections of the wind generator are coupled by a perforated shaft inside the central profile, located inside the first central generation system.

\* \* \* \* \*

UNITED STATES PATENT AND TRADEMARK OFFICE
CERTIFICATE OF CORRECTION

PATENT NO.        : 8,994,207 B2                           Page 1 of 1
APPLICATION NO.   : 13/991142
DATED             : March 31, 2015
INVENTOR(S)       : Mauricio Giraldo Orozco et al.

It is certified that error appears in the above-identified patent and that said Letters Patent is hereby corrected as shown below:

In the claims:

Column 6, claim 1, line 55, "(6)" please delete.
Column 6, claim 1, line 56, "(61)" please delete.

Signed and Sealed this
Seventeenth Day of November, 2015

Michelle K. Lee
*Director of the United States Patent and Trademark Office*